(12) United States Patent
Liao et al.

(10) Patent No.: US 8,113,850 B2
(45) Date of Patent: Feb. 14, 2012

(54) COMPUTER

(75) Inventors: Tsung-Kuel Liao, Taipei Hsien (TW);
Te-Chung Kuan, Taipei Hsien (TW);
Pei-Lin Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 103 days.

(21) Appl. No.: 12/641,222

(22) Filed: Dec. 17, 2009

(65) Prior Publication Data
US 2011/0151683 A1 Jun. 23, 2011

(51) Int. Cl.
*H01R 12/00* (2006.01)

(52) U.S. Cl. ............. 439/65; 439/62; 361/736; 361/748

(58) Field of Classification Search ............ 439/61, 439/65, 62; 361/736, 748
See application file for complete search history.

(56) References Cited

U.S. PATENT DOCUMENTS

| 6,978,333 | B2 * | 12/2005 | Timmins et al. ............ 710/301 |
| 7,046,511 | B2 * | 5/2006 | McClure et al. ......... 361/679.33 |
| 2003/0049948 | A1 * | 3/2003 | Kim et al. ..................... 439/61 |

* cited by examiner

*Primary Examiner* — Gary F. Paumen
(74) *Attorney, Agent, or Firm* — Altis Law Group, Inc.

(57) ABSTRACT

A computer includes an expansion card, a mother board and a connector. The mother board includes an expansion slot thereon. The expansion slot corresponds to the expansion card. The connector connects the expansion card and the expansion slot.

4 Claims, 2 Drawing Sheets

COMPUTER

BACKGROUND

1. Technical Field

The present disclosure relates to computers, and particularly to a computer including an expansion card.

2. Description of Related Art

Typically, one or more expansion slots are disposed on a motherboard of a computer for connecting expansion cards. However, as computers become more compact, the current expansion cards make it difficult to place memory modules on the motherboard of the computer in a more compact configuration.

Therefore, a new type of computer is desired to overcome the above described shortcoming.

DETAILED DESCRIPTION

Figure 1:
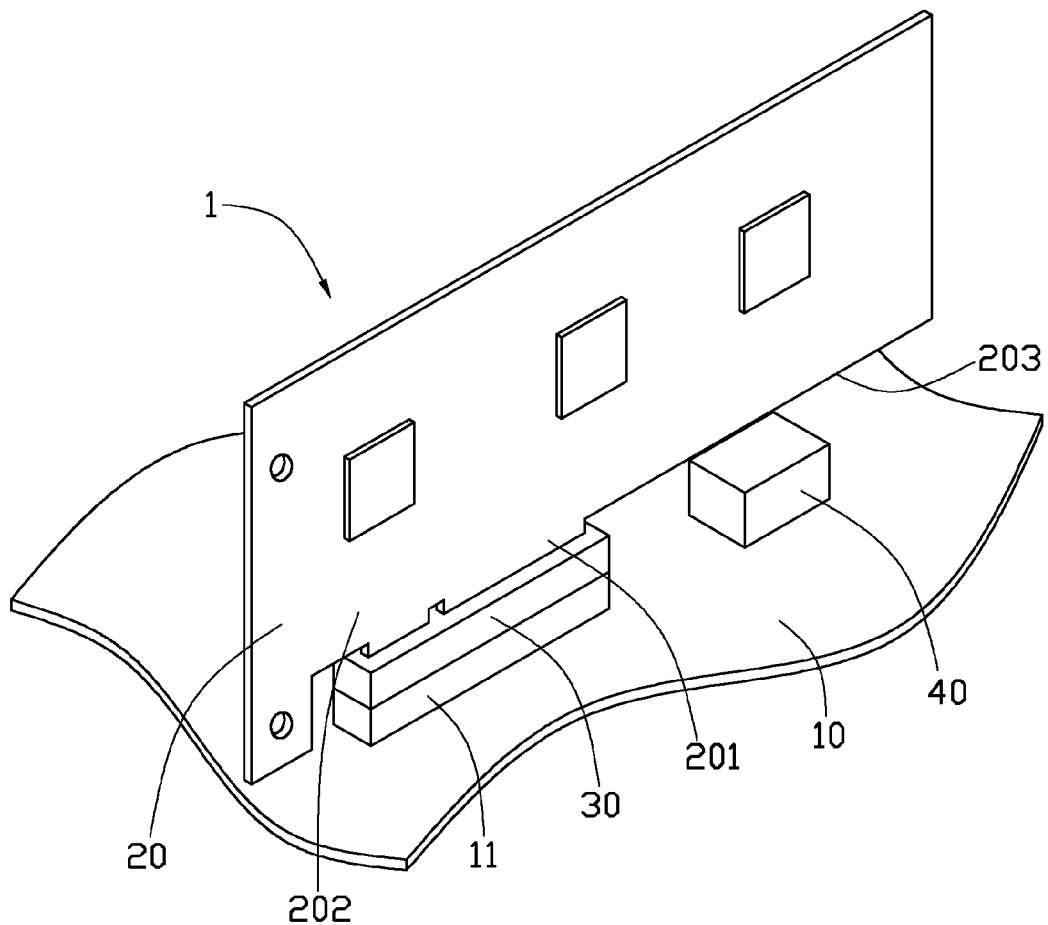
FIG. 1 is a partial, assembled and isometric view of a computer with an expansion card in accordance with an embodiment of the present disclosure.
Figure 2:
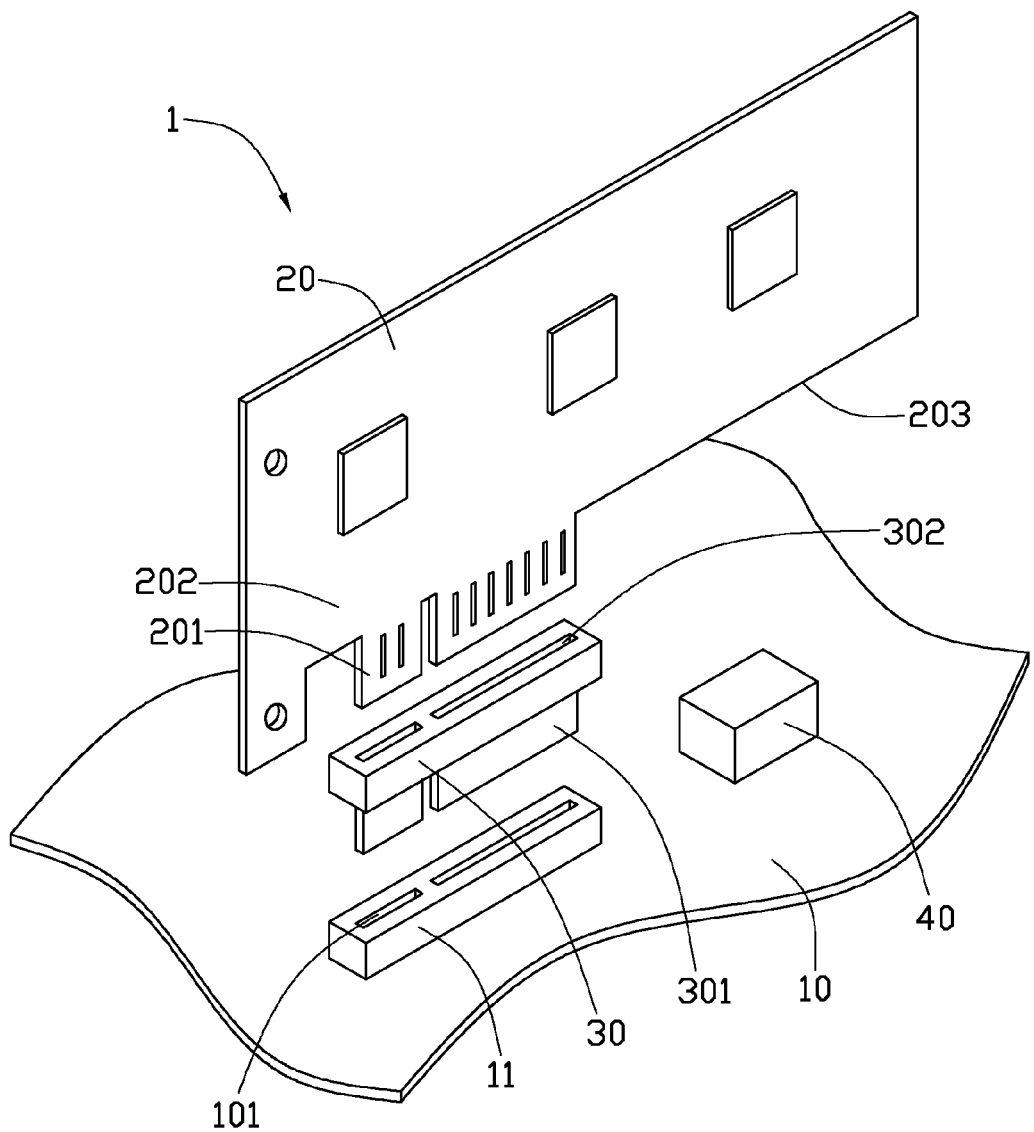
FIG. 2 is a partial, isometric and exploded view of the computer of FIG. 1.

FIGS. 1-2 show a computer 1 with an expansion card in accordance with an embodiment of the present disclosure. The computer 1 includes a motherboard 10, an expansion card 20, and a connector 30. A connector 11 is formed on the motherboard 10. An expansion slot 101 is defined in a top of the connector 11. A memory module 40 is mounted on the motherboard 10. The memory module 40 is located on an extension line of the expansion slot 101. In the illustrated embodiment, the expansion card 20 is a PCI (peripheral component interconnect) expansion card and the expansion slot 101 is a PCI expansion slot. In another embodiment, the expansion card 20 can be a PCI Express card or an AGP (Accelerated Graphics Port) card. An interface of the expansion slot 101 corresponds to an interface of the expansion card 20.

A connecting slot 302 is defined at a top of the connector 30. A first pin set 301 is formed at a bottom of the connector 30. The first pin set 301 of the connector 30 is inserted into the expansion slot 101. A second pin set 201 is formed at a bottom of a left side 202 of the expansion card 20. The second pin set 201 is inserted into the connecting slot 302 of the connector 30. A right side 203 of the expansion card 20 is located above and spaced from the memory module 40.

The expansion card 20 is electrically connected to the expansion slot 101 via the connector 30. Furthermore, the connector 30 increases a vertical space between the expansion card 20 and the motherboard 10. Thus, the right side 203 of the expansion card 20 is vertically spaced from the memory module 40 without a modification of a layout of the motherboard 10 and allowing a more compact configuration of the expansion card 20 and the memory module 40.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer, comprising:
    an expansion card;
    a motherboard with a first connector formed thereon, an expansion slot defined in a top of the first connector; and
    a second connector electrically connecting the expansion card to the expansion slot, wherein the first connector, the second connector and the expansion card are aligned with each other along a direction perpendicular to the motherboard;
    wherein a connecting slot is defined at a top of the second connector, a first pin set is formed at a bottom of the second connector, the first pin set is inserted into the expansion slot of the first connector, the expansion card forms a second pin set, and the second pin set is inserted into the connecting slot of the second connector.

2. The computer of claim 1, further comprising a memory module, the memory module being mounted on the motherboard, the expansion card being located above and spaced from the memory module.

3. The computer of claim 2, wherein the memory module is located on an extension line of the expansion slot.

4. The computer of claim 2, wherein the second pin set is formed on one side of the expansion card, and the memory module is located corresponding to another side of the expansion card.

* * * * *